United States Patent
Khafagy et al.

(10) Patent No.: US 10,040,455 B2
(45) Date of Patent: Aug. 7, 2018

(54) VEHICLE PARK MECHANISM ACTUATION

(71) Applicant: Ford Global Technologies, LLC, Dearborn, MI (US)

(72) Inventors: Hafiz Shafeek Khafagy, Dearborn, MI (US); Mark Douglas Malone, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 115 days.

(21) Appl. No.: 15/365,042

(22) Filed: Nov. 30, 2016

(65) Prior Publication Data

US 2018/0148057 A1 May 31, 2018

(51) Int. Cl.
| | | |
|---|---|---|
| *B60W 10/18* | (2012.01) | |
| *B60W 30/18* | (2012.01) | |
| *F16H 61/02* | (2006.01) | |
| *B60W 10/30* | (2006.01) | |
| *B60W 10/06* | (2006.01) | |

(52) U.S. Cl.
CPC ...... *B60W 30/18054* (2013.01); *B60W 10/06* (2013.01); *B60W 10/182* (2013.01); *B60W 10/30* (2013.01); *F16H 61/0202* (2013.01); *B60W 2510/244* (2013.01); *B60W 2710/188* (2013.01); *B60W 2710/30* (2013.01)

(58) Field of Classification Search
None
See application file for complete search history.

(56) References Cited

U.S. PATENT DOCUMENTS

| | | | | |
|---|---|---|---|---|
| 5,706,909 | A * | 1/1998 | Bevins | B60R 25/04 180/273 |
| 6,758,298 | B2 * | 7/2004 | Eberling | B60T 17/221 180/272 |
| 7,513,576 | B2 * | 4/2009 | Hilberer | B60T 13/38 180/273 |
| 7,890,243 | B2 | 2/2011 | Abendroth | |
| 8,485,301 | B2 | 7/2013 | Grubaugh et al. | |
| 9,017,216 | B1 * | 4/2015 | Holub | B60W 10/11 477/94 |
| 9,145,126 | B2 * | 9/2015 | Kinoshita | B60K 28/12 |
| 9,248,817 | B2 * | 2/2016 | Accardi | B60T 15/041 |
| 9,381,895 | B1 * | 7/2016 | Smathers | B60T 7/12 |
| 2006/0151227 | A1 * | 7/2006 | Reith | B60N 2/002 180/273 |
| 2013/0131939 | A1 * | 5/2013 | Lee | B60W 10/06 701/53 |

FOREIGN PATENT DOCUMENTS

| | | |
|---|---|---|
| ES | 2561729 | 2/2016 |
| FR | 2940211 A3 | 6/2010 |

* cited by examiner

*Primary Examiner* — Dirk Wright
(74) *Attorney, Agent, or Firm* — Brooks Kushman P.C.

(57) ABSTRACT

A vehicle includes an engine and a vehicle park mechanism. The vehicle further includes a controller configured initiate an auto-stop of the engine in response to an auto-stop condition. The controller is further configured to actuate the vehicle park mechanism in response to a driver exit condition and the engine being auto-stopped.

18 Claims, 3 Drawing Sheets

VEHICLE PARK MECHANISM ACTUATION

TECHNICAL FIELD

This disclosure relates to actuating a vehicle park mechanism, and more particularly, to actuating a vehicle park mechanism in response to detecting a driver exit condition while in an engine auto-stop mode.

BACKGROUND

An auto-stop/start vehicle may enable a stop/start strategy for starting and stopping the vehicle engine during a drive cycle. This may occur, for example, when the vehicle stops at traffic signals, cross-walks, stop signs, and the like. The engine is shut down if no power is required (e.g., while waiting at a traffic light). As soon as power is requested, the engine is automatically restarted. By avoiding unnecessary engine idling, the vehicle's fuel economy will be improved. For this reason, it is desirable to use the engine shutdown function as much as possible when engine auto-stop conditions are satisfied.

In many approaches, a presence detection system determines the presence of a driver as a necessary condition prior to initiating an engine auto-stop. In still other approaches, engine auto-start is initiated upon detection of a driver exiting the vehicle.

SUMMARY

In a vehicle provided with auto-stop/start capabilities, engine auto-start may be inhibited upon detection of a driver exiting the vehicle.

In one approach, a vehicle includes an engine and a vehicle park mechanism. The vehicle further includes a controller configured initiate an auto-stop of the engine in response to an auto-stop condition. The controller is further configured to actuate the vehicle park mechanism in response to a driver exit condition and the engine being auto-stopped.

In another approach, a vehicle system includes a controller. The controller is configured initiate an engine auto-stop mode in response to an auto-stop condition, and to actuate a vehicle park mechanism in response to a driver exit condition and the engine auto-stop mode.

In still another approach, a method for controlling an engine of a vehicle includes, by a controller, initiating an engine auto-stop mode in response to an auto-stop condition. The method further includes detecting a driver exit condition while in the engine auto-stop mode. The method further includes actuating a vehicle park mechanism in response to the detecting.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
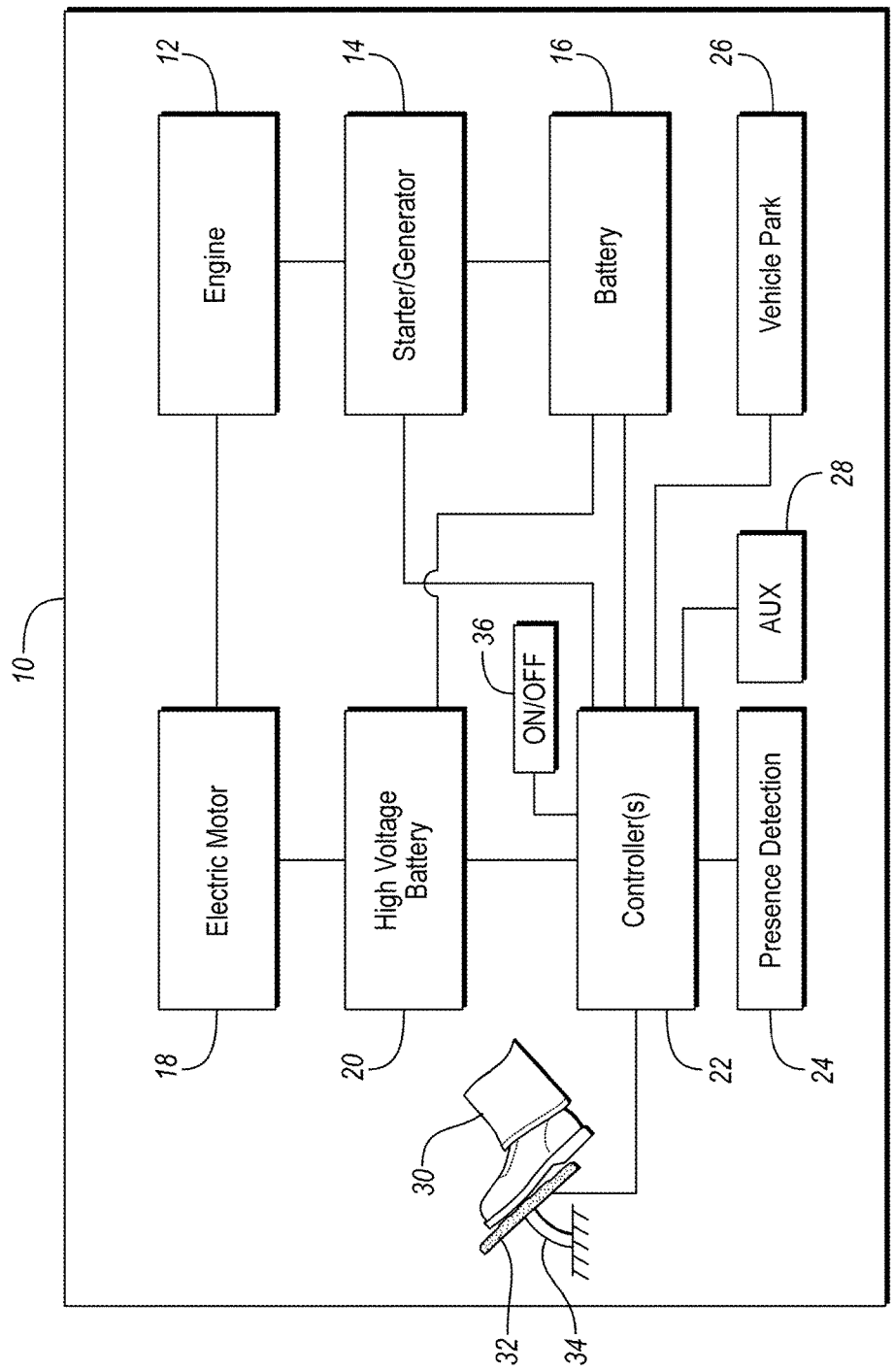
FIG. 1 is a block diagram of a hybrid vehicle.

Referring to FIG. 1, a vehicle 10, such as a hybrid electric vehicle or micro-hybrid vehicle, may include an engine 12, an engine starter/generator 14 (e.g., a belt starter/generator), and a battery 16 connected to the engine starter/generator 14. The engine 12 is mechanically connected with the engine starter/generator 14 such that the engine 12 may drive the engine starter/generator 14 to generate electric current. The battery 16 is preferably a low voltage battery (e.g., a 12 V battery), but may also be a high voltage battery or any other suitable battery. The engine starter/generator 14 and battery 16 are electrically connected with each other. Hence, the engine starter/generator 14 may charge the battery 16.

In some approaches, such as in hybrid electric vehicles, the hybrid vehicle 10 also includes an electric motor or generator 18 powered by a battery, such as a high voltage battery 20. Other hybrid, micro-hybrid, or stop/start vehicle configurations are also contemplated.

The battery 16 is in communication with at least one controller 22. The controller 22 receives an indication of a state of charge (SOC) of the battery 16. The indication of the battery SOC may be expressed as a percentage, or any other suitable indication of the battery SOC. The indication of the battery SOC may be determined at the controller 22 or received at an input (not shown) of the controller 22.

The controller 22 is also connected to one or more presence detection systems 24. A presence detection system 24 may include, for example, a seatbelt detector for detecting a seatbelt configuration (e.g., buckled or unbuckled), a door detector for detecting a door displacement (e.g., opening or closing) or door configuration (e.g., open or closed), a door handle detector for detecting a door handle configuration (e.g., engaged or disengaged), a seat detector (e.g., weight sensor, optical sensor, humidity sensor, etc.) for detecting a presence of a person (e.g., seat occupied or unoccupied). In this way, the controller 22 may be informed that a vehicle occupant (e.g., the driver) has departed or is preparing to depart the vehicle 10. Similarly, the controller 22 may be informed that a vehicle occupant has reentered or is preparing to reenter the vehicle 10. Occupancy may be continuously monitored by the presence detection system 24, or may be monitored only upon initiation of an engine auto-stop mode.

The controller 22 is also connected to one or more vehicle park systems 26. In one example, the vehicle park system 26 is an electrical park brake (EPB) that utilizes a motor to pull a cable connected to the EPB to actuate the EPB. In another example, the vehicle park system 26 is parking pawla shift-by-wire (SBW) or park-by-wire (PBW) transmission having a parking pawl that may be controlled to engage a park gear. SBW refers to an arrangement having no mechanical connection between a transmission control device and the transmission. Instead, a gear shift module transmits an electrical signal to an electronic controller, which directs separate actuators to apply or release the various friction elements, such as clutches or brakes, to obtain a desired gear ratio. In such approaches, the transmission is provided with a parking pawl that is operated by one of the actuators. The parking pawl may engage with at least one gear in the transmission to inhibit vehicle motion or release from the at least one gear to permit vehicle motion. In some approaches, the parking pawl may be engaged in response to a driver shifting the transmission to PARK. In other approaches, a parking pawl may be engaged in response to a driver activating a parking brake. In still another example, the vehicle park system 26 includes an anti-lock brake system (ABS). In still another example, the vehicle park system 26 includes two or more of an EPB, a SBW parking pawl, and an ABS. Of course, various other mechanically-, electrically-, or hydraulically-actuated parking mechanisms may also be used to inhibit vehicle motion.

The controller 22 is also connected to one or more auxiliary systems 28. Auxiliary systems 28 may include, for example, HVAC systems for heating, cooling, or otherwise controlling the climate of the interior of the vehicle 10, heating systems for defrosting windows, heating systems for heating seats or a steering wheel, exhaust/cooling fans, or power systems for providing power to charge or operate third party devices such as mobile phones, GPS devices, etc.

The controller 22 may also be informed when a user 30 applies or removes pressure at a brake pedal 32. In some approaches, the controller 22 may receive signals representing the magnitude of displacement from a reference position of the brake pedal 32 as detected by pedal position or pressure sensor 34.

The controller 22 may include other suitable sensors for determining other vehicle operating conditions.

The controller 22 may issue auto-stop commands (e.g., commands to stop the engine 12 during a drive cycle) and auto-start commands (e.g., commands to start the engine 12 during a drive cycle). The controller 22 may issue auto-stop commands and auto-start commands based on signals from various vehicle subsystems and components, including a brake pedal 32 and other components (not pictured) such as a gear lever, a speed sensor, and an accelerator pedal. Generally speaking, the base stop/start logic comprises determining whether the vehicle 10 is stopping or has been stopped for at least a threshold time, and if, so issuing an auto-stop command. For example, as the vehicle 10 comes to a stop, the controller 22 may issue a command to begin the process to stop the engine 12. In this way, the controller 22 is configured initiate an engine auto-stop mode upon an auto-stop condition. As a brake pedal 32 is disengaged and/or an accelerator pedal (not shown) is engaged after an engine auto-stop, the controller 22 may issue a command to begin the process to start the engine 12. The engine 12 will be shut down in response to auto-stop commands and will be started in response to auto-start commands.

Figure 2:
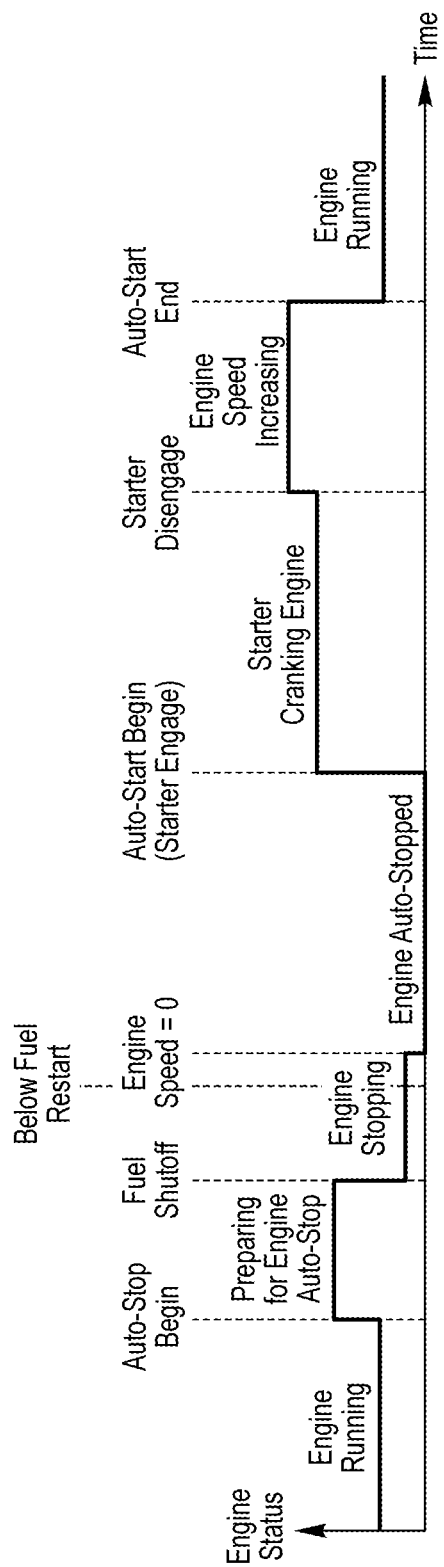
FIG. 2 is a plot of engine status versus time before, during and after an engine stop/start event.

Referring to FIG. 2, an engine auto-stop event may include several stages. "Auto-stop begin" marks the beginning of the engine auto-stop event. "Preparing for engine auto-stop" is the time period during which vehicle systems as well as the engine are prepared for the impending engine stop. If an auto-stop inhibit condition is detected during this stage, the preparation for the impending engine stop is discontinued and the vehicle systems and engine are returned to their normal operating modes. "Fuel shutoff" marks the point at which fuel flow to the engine is stopped. "Engine stopping" is the time period during which the engine speed decreases to 0. "Below fuel restart" marks the point after which if a restart is requested during the "engine stopping" stage, the starter may need to be engaged to crank the engine. If a restart is requested before "below fuel restart" and during the "engine stopping" stage, the engine may be restarted by turning the flow of fuel back on. "Engine speed=0" marks the point at which the engine speed is near or equal to 0.

"Engine auto-stopped" is the time period during which the engine is off. "Starter engage" marks the point at which the starter starts to crank the engine in an effort to start the engine in response to detecting an engine auto-start condition. "Starter cranking engine" is the time period during which the engine is unable to crank under its own power. "Starter disengage" marks the point at which the engine is able to crank under its own power. "Engine speed increasing" is the time period during which the speed of the engine increases to its running speed (a speed at or above target idle speed). "Auto-start end" marks the point at which the speed of the engine achieves its running speed.

In many environments, a driver is required to frequently exit and reenter a vehicle. Such vehicles may include common carriers, agriculture collection vehicles (e.g., fruit harvest vehicles), mail delivery vehicles, emergency vehicles, waste collection vehicles, transport vehicles, or other upfit vehicles. For example, a driver of a vehicle upfitted for collecting fruits or vegetables frequently must bring the vehicle to a stop and depart the vehicle for several minutes at a time. Upon collecting the produce, the driver reenters the vehicle, proceeds a short distance, and repeats the process until the job is complete.

Referring again to FIG. 1, it may be advantageous to maintain a vehicle 10 in an auto-stopped mode when the presence detection system 24 determines a vehicle occupant (e.g., the driver) has departed or is preparing to depart the vehicle 10. In this regard, the controller 22 may operate the vehicle 10 in an "auto-park" mode.

When in the auto-park mode, the controller 22 operates the vehicle 10 according the previously-described engine auto-stop/start routines. While in an auto-stop mode, the controller 22 monitors the presence detection system 24 for indication that the user 30 is preparing to exit the vehicle 10. The exit indication may be, for example, an unbuckling of a seatbelt or detection of an unbuckled seatbelt, a displacement (e.g., opening) or configuration (e.g., open) of a door, a displacement of a portal opening such as a window or point of ingress/egress, a detection that a seat is unoccupied or that a user has started to rise from a seat (e.g., through weight sensors or optical sensors), or a detection that a driver cabin is unoccupied (e.g., using one or more cameras). In an autonomous vehicle, the exit indication may be an indication that the vehicle is stopping or has stopped.

In response to detecting an exit indication while in the auto-stopped mode, the controller 22 is configured to perform a vehicle park operation via the vehicle park system 26. For example, when the vehicle park system 26 is an electrical park brake (EPB), in response to detecting an exit indication, the controller 22 may control a corresponding motor to actuate the EPB. In another example, when the vehicle park system 26 is a SBW parking pawl, in response to detecting an exit indication, the controller 22 may cause the parking pawl to engage a park gear in the transmission of the vehicle. In still another example, the controller both applies the EPB and engages the parking pawl in response to detecting an exit indication. In these examples, in response to detecting an exit indication, the controller 22 puts the vehicle 10 into a park mode while in an auto-stop mode.

In some approaches, the controller 22 is further configured to reduce an auxiliary load in response to determining the driver exit condition while in the engine auto-stop mode. The auxiliary load to be reduced may be, for example, any one or more of an HVAC system, a heating system for defrosting windows or for heating seats or a steering wheel, exhaust/cooling fans, or auxiliary power systems.

As described, the controller 22 is configured to initiate an auto-park mode when a user exit condition is detected while in an auto-stop mode. In one approach, the controller 22 is configured to automatically initiate the auto-park mode when a user exit condition is detected while in an auto-stop mode. In this approach, the auto-park mode is continuously enabled. In another approach, the controller 22 is configured to initiate the auto-park mode only if the auto-park mode has been authorized by a user, for example, through a user input 36. In this approach, the auto-park mode is selectively enabled. Also in this approach, the controller 22 may initiate an engine auto-start to alert the user that the vehicle 10 has not been manually parked.

In some approaches, the controller 22 initiates an engine auto-start in response to information received from another system or subsystem. For example, the controller 22 may initiate an engine auto-start when a battery state of charge drops below a threshold state of charge, or when a battery voltage drops below a threshold voltage. In these approaches, the controller 22 continues to maintain the vehicle in the auto-park mode through the vehicle park system 26. In another example, the controller 22 may initiate an engine auto-start when the presence detection system 24 detects a user occupancy indicating the user has reentered the vehicle 10. In still other approaches, the controller 22 initiates an engine auto-start in response to a request from the user, such as when the brake pedal 32 is subsequently actuated, when the accelerator pedal (not shown) is actuated, or when the gear lever is moved.

In a preferred approach, the controller 22 maintains the vehicle in the auto-park mode through the vehicle park system 26 until a user command is received. Upon receiving the user command, the auto-park mode is deactivated (i.e., the EPB and/or the parking pawl are disengaged). The user command to deactivate the auto-park mode may be received at the user input 36, through actuation of the brake pedal 32, accelerator pedal (not shown), or gear lever. In this way, user command to deactivate the auto-park mode may correspond to, or be the same as, the action requesting engine auto-start.

Figure 3:
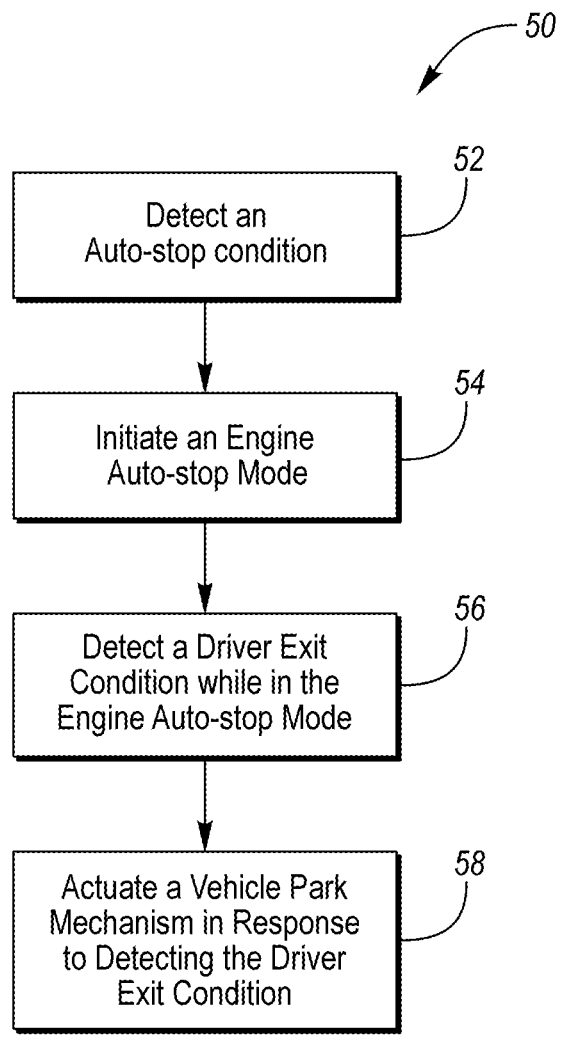
FIG. 3 is a flowchart illustrating an algorithm for controlling actuation of a vehicle park mechanism.

Referring now to FIG. 3, a method 50 for controlling an engine of a vehicle includes detecting 52 an auto-stop condition. The method further includes initiating 54 an engine auto-stop mode upon the auto-stop condition. The method further includes detecting 56 a driver exit condition while in the engine auto-stop mode. Furthermore, the method includes actuating 58, at a controller, a vehicle park mechanism in response to detecting the driver exit condition while in the engine auto-stop mode.

In some approaches, the method further includes reducing an auxiliary load in response to determining the driver exit condition while in the engine auto-stop mode. In other approaches, the method further includes initiating, with the vehicle park mechanism actuated, an engine auto-start in response to at least one of a battery state of charge falling below a state of charge threshold and a battery voltage falling below a voltage threshold. In still other approaches, the method includes initiating an engine auto-start mode upon an auto-start condition, and deactivating the vehicle park mechanism in response to a user command.

In still another approach, a method includes detecting an auto-stop condition, initiating an engine auto-stop mode upon an auto-stop condition, and detecting a driver exit condition while in the engine auto-stop mode. The method further includes determining a vehicle speed. When the vehicle speed is at or below a predefined threshold (e.g., less than or equal to 2 miles-per-hour), the method includes actuating, at a controller, a vehicle park mechanism in response to detecting the driver exit condition while in the engine auto-stop mode. When the vehicle speed is above a predefined threshold (e.g., greater than 2 miles-per-hour), the method includes actuating, at a controller, a first vehicle park mechanism (e.g., ABS and/or EPB) to reduce the vehicle speed. When the vehicle speed is reduced to or below the predefined threshold, the method includes actuating, at the controller, a second vehicle park mechanism (e.g., a SBW parking pawl) in response to detecting the driver exit condition while in the engine auto-stop mode. The method may further include reducing an auxiliary load in response to determining the driver exit condition while in the engine auto-stop mode. The method may further include initiating an engine start upon confirmation of driver presence.

In still another approach, a method includes detecting an auto-stop condition, initiating an engine auto-stop mode upon an auto-stop condition, and detecting a driver exit condition while in the engine auto-stop mode. In a vehicle equipped with EPB, the method further includes actuating, at a controller, an ABS in coordination with an EPB to hold the vehicle position in response to detecting the driver exit condition. In a vehicle not equipped with EPB, the method further includes actuating, at a controller, an ABS to hold the vehicle position in response to detecting the driver exit condition. In this approach, engine restart may be inhibited until confirmation of driver presence. The method may further include reducing an auxiliary load in response to determining the driver exit condition while in the engine auto-stop mode. The method may further include initiating an engine start upon confirmation of driver presence.

In still another approach, a method includes detecting a driver exit condition while the engine is running. The method further includes determining a vehicle speed. When the vehicle speed is at or below a predefined threshold (e.g., less than or equal to 2 miles-per-hour), the method includes actuating, at a controller, a vehicle park mechanism in response to detecting the driver exit condition. When the vehicle speed is above a predefined threshold (e.g., greater than 2 miles-per-hour), the method includes actuating, at a controller, a first vehicle park mechanism (e.g., ABS and/or EPB) to reduce the vehicle speed. When the vehicle speed is reduced to or below the predefined threshold, the method includes actuating, at the controller, a second vehicle park mechanism (e.g., a SBW parking pawl) in response to detecting the driver exit condition while in the engine auto-stop mode. The method may further include reducing an auxiliary load in response to determining the driver exit condition while in the engine auto-stop mode. The method may further include sounding an audible alert to wan of potential for engine idle. The method may further include initiating an engine start upon confirmation of driver presence.

In still another approach, a method includes detecting a driver exit condition while the engine is running. In a vehicle equipped with EPB, the method further includes actuating, at a controller, an ABS in coordination with an EPB to hold the vehicle position in response to detecting the driver exit condition. In a vehicle not equipped with EPB, the method further includes actuating, at a controller, an ABS to hold the vehicle position in response to detecting the driver exit condition. In this approach, engine restart may be inhibited until confirmation of driver presence. In this approach, engine restart may be inhibited until confirmation of driver presence. The method may further include reducing an auxiliary load in response to determining the driver exit condition while in the engine auto-stop mode. The method may further include sounding an audible alert to wan of potential for engine idle. The method may further include initiating an engine start upon confirmation of driver presence.

The approaches described herein may be particularly advantageous in environments in which a driver is required to frequently exit and reenter a vehicle. For example, the approaches allow a vehicle to remain in a "ready to drive" mode while maintaining the benefits afforded by auto-stop enabled vehicles. Furthermore, energy consumption of auxiliary components is reduced, thereby extending an auto-stop period. Extending an auto-stop period has been found to improve fuel economy of a vehicle. The approaches described herein also reduce the likelihood of accidental roll-away or movement of the vehicle while the driver seat is not occupied.

The processes, methods, or algorithms disclosed herein may be deliverable to/implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writable storage media such as floppy disks, magnetic tapes, CDs, RAM devices, and other magnetic and optical media. The processes, methods, or algorithms may also be implemented in a software executable object. Alternatively, the algorithms may be embodied in whole or in part using suitable hardware components, such as Application Specific Integrated Circuits (ASICs), Field-Programmable Gate Arrays (FPGAs), state machines, or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   an engine;
   a vehicle park mechanism; and
   a controller configured initiate an auto-stop of the engine in response to an auto-stop condition, and to actuate the vehicle park mechanism in response to a driver exit condition and the engine being auto-stopped.

2. The vehicle of claim 1, wherein the driver exit condition is an unbuckling of a seatbelt.

3. The vehicle of claim 1, wherein the driver exit condition is an opening of a door.

4. The vehicle of claim 1, wherein the vehicle park mechanism is an electric park brake.

5. The vehicle of claim 1, wherein the vehicle park mechanism is a parking pawl.

6. The vehicle of claim 1, wherein the controller is further configured to reduce power to an auxiliary load in response to the driver exit condition and the engine being auto-stopped.

7. The vehicle of claim 6, wherein the auxiliary load is a climate control system, an engine fan, or a seat warmer.

8. A vehicle system comprising:
   a controller configured initiate an engine auto-stop mode in response to an auto-stop condition, and to actuate a vehicle park mechanism in response to a driver exit condition and the engine auto-stop mode.

9. The vehicle system of claim 8, wherein the driver exit condition is an unbuckling of a seatbelt.

10. The vehicle system of claim 8, wherein the driver exit condition is an opening of a door.

11. The vehicle system of claim 8, wherein the vehicle park mechanism is an electric park brake.

12. The vehicle system of claim 8, wherein the vehicle park mechanism is a parking pawl.

13. The vehicle system of claim 8, wherein the controller is further configured to reduce power to an auxiliary load in response to the driver exit condition and the engine auto-stop mode.

14. The vehicle system of claim 13, wherein the auxiliary load is a climate control system, an engine fan, or a seat warmer.

15. A method for controlling an engine of a vehicle comprising:
   by a controller,
      initiating an engine auto-stop mode in response to an auto-stop condition;
      detecting a driver exit condition while in the engine auto-stop mode; and
      actuating a vehicle park mechanism in response to the detecting.

16. The method of claim 15, further comprising:
   reducing power to an auxiliary load in response to the detecting.

17. The method of claim 15, further comprising:
   initiating an engine auto-start in response to a battery state of charge falling below a state of charge threshold.

18. The method of claim 15, further comprising:
   initiating an engine auto-start mode in response to an auto-start condition; and
   deactivating the vehicle park mechanism in response to a user command.

* * * * *